(12) United States Patent
Lee

(10) Patent No.: US 9,255,616 B2
(45) Date of Patent: Feb. 9, 2016

(54) FAN CLUTCH FOR VEHICLE

(71) Applicant: Hyundai Motor Company, Seoul (KR)

(72) Inventor: Seon Min Lee, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 199 days.

(21) Appl. No.: 14/035,553

(22) Filed: Sep. 24, 2013

(65) Prior Publication Data

US 2015/0014112 A1 Jan. 15, 2015

(30) Foreign Application Priority Data

Jul. 11, 2013 (KR) .................... 10-2013-0081509

(51) Int. Cl.
*F16D 35/02* (2006.01)
(52) U.S. Cl.
CPC .................... *F16D 35/021* (2013.01)
(58) Field of Classification Search
CPC ...... F16D 35/02; F16D 35/021; F16D 35/024
See application file for complete search history.

(56) References Cited

U.S. PATENT DOCUMENTS

| | | | | |
|---|---|---|---|---|
| 3,498,431 | A * | 3/1970 | Alex | 192/57 |
| 4,046,239 | A * | 9/1977 | Tinholt | 192/58.5 |
| 7,886,886 | B2 | 2/2011 | Schultheiss et al. | |
| 7,938,240 | B2 * | 5/2011 | Hennessy et al. | 192/58.61 |
| 2004/0168877 | A1 * | 9/2004 | Drager et al. | 192/58.5 |
| 2004/0242335 | A1 * | 12/2004 | Yamauchi | 464/24 |
| 2005/0019149 | A1 * | 1/2005 | Pickelman et al. | 415/1 |

FOREIGN PATENT DOCUMENTS

| | | |
|---|---|---|
| JP | 10-281187 A | 10/1998 |
| JP | 11-101272 A | 4/1999 |
| JP | 2012-107727 A | 6/2012 |
| KR | 10-2006-0096193 A | 9/2006 |
| KR | 10-2009-0110645 A | 10/2009 |
| KR | 10-2010-0011279 A | 2/2010 |

* cited by examiner

*Primary Examiner* — Jacob S Scott
(74) *Attorney, Agent, or Firm* — Morgan, Lewis & Bockius LLP

(57) ABSTRACT

A fan clutch for a vehicle may include a shaft rotated by a drive force and having a first oil line formed in the shaft in a radial direction thereof, a rotor rotated in combination with the shaft, wherein the rotor includes an oil storage chamber formed in the rotor and the oil storage chamber communicates with the first oil line, a valve formed in an end of the oil storage chamber and being selectively opened, wherein the valve may be configured to allow oil stored in the oil storage chamber to flow to an outside of the rotor through the first oil line, and a housing formed to surround the rotor, and provided with a second oil line through which the oil that has flowed through the valve flows to the first oil line through an actuation chamber surrounding the rotor.

8 Claims, 3 Drawing Sheets

FAN CLUTCH FOR VEHICLE

CROSS-REFERENCE TO RELATED APPLICATION

The present application claims priority to Korean Patent Application No. 10-2013-0081509, filed on Jul. 11, 2013, the entire contents of which is incorporated herein for all purposes by this reference.

BACKGROUND OF THE INVENTION

1. Field of the Invention

The present invention relates, in general, to a fan clutch for a vehicle and, more particularly, to a fan clutch for a vehicle which can minimize the amount of oil that has been supplied into an actuation chamber before an engine is started, thereby improving both the cold start performance and the acceleration performance of the vehicle.

2. Description of Related Art

Typically, a cooling fan is a device that is installed in an engine compartment of a vehicle and functions to improve the cooling efficiency of cooling water charged in a radiator, thereby allowing the cooling water circulating in the engine to be maintained at a constant temperature.

The cooling fans for vehicles are typically classified into automatic fan type devices and mechanical fan clutch type devices. Of the related art cooling fans, the mechanical fan clutch type device is configured such that it responds to the temperature of the cooling water charged in the radiator, and drives a cooling fan only when the temperature of the cooling water is higher than a predetermined temperature.

FIG. 1 is a sectional view illustrating the construction of a conventional liquid fan clutch for a vehicle.

As shown in FIG. 1, the conventional fan clutch includes: a fan housing 10 that is formed by assembling left and right housing parts into a single body, and a rotor 40 that is installed in the inner space of the fan housing 10 such that the rotor 40 can be rotated. The rotor 40 is connected to a rotating shaft 20 such that the rotor 40 can be rotated by the drive force of an engine which is transmitted from an engine crankshaft (not shown).

Here, a bearing 30 is set between the fan housing 10 and rotating shaft 20, so, when the rotating shaft 20 is being rotated, the fan housing 10 is not rotated by the rotating force of the rotating shaft 20.

The inner space of the fan housing 10 is divided into an oil storage chamber S and an actuation chamber D by a partition plate 50. In the fan housing 10, oil is stored in the oil storage chamber S, and the rotor 40 is installed in the actuation chamber D. Further, an oil supply valve 60 is installed on a side surface of the partition plate 50, and functions to feed oil from the oil storage chamber S to the actuation chamber D. In FIG. 1, the reference numeral 61 denotes a pulley, and the reference numeral 70 denotes an oil line.

Due to the above-mentioned construction, when the rotating shaft 20 is rotated, the rotor 40 is rotated in the actuation chamber D of the fan housing 10. In the above state, the oil supply valve 60 is opened and feeds oil from the oil storage chamber S to the actuation chamber D, so a viscosity resistance is produced in the actuation chamber D by the oil, and this causes the fan housing 10 to be rotated along with the rotor 40. Here, the rotating speed of the fan housing 10 is increased in proportion to an increase in the viscosity resistance that is produced in the actuation chamber D by the oil, in which the increase in the viscosity resistance is in proportion to an increase in the amount of oil charged in the actuation chamber D, and reduces the slipping of the fan housing 10 relative to the rotating rotor 40.

However, in the related art technique, before starting the vehicle, oil that has been stored in the oil storage chamber flows from the oil storage chamber into the actuation chamber through a return line due to gravity.

Accordingly, the related art technique is problematic in that, when starting the vehicle in the above-mentioned state, both the rotor and the fan housing are rotated at the same time due to the viscosity resistance of oil that has been introduced into the actuation chamber, so a shearing force is generated in the fan clutch and the load imposed on a starter is increased when the vehicle is started.

Further, due to the above-mentioned problem, the cooling fan is not separated from the fan clutch when initially starting the vehicle, and the rpm of the cooling fan is increased following an increase in the engine rpm, so the acceleration performance of the vehicle is reduced.

The foregoing is intended merely to aid in the understanding of the background of the present invention, and is not intended to mean that the present invention falls within the purview of the related art that is already known to those skilled in the art.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a fan clutch for a vehicle which can minimize the amount of oil that has been supplied into an actuation chamber before an engine is started, thereby improving both the cold start performance and the acceleration performance of the vehicle.

In an aspect of the present invention, a fan clutch for a vehicle may include a shaft rotated by a drive force and having a first oil line formed in the shaft in a radial direction thereof, a rotor rotated in combination with the shaft, wherein the rotor may include an oil storage chamber formed in the rotor and the oil storage chamber communicates with the first oil line, a valve formed in an end of the oil storage chamber and being selectively opened, wherein the valve is configured to allow oil stored in the oil storage chamber to flow to an outside of the rotor through the first oil line, and a housing formed to surround the rotor, and provided with a second oil line through which the oil that may have flowed through the valve flows to the first oil line through an actuation chamber surrounding the rotor.

The oil storage chamber is formed inside an inner circumference of the rotor in a circumferential direction such that the oil storage chamber surrounds the shaft, and the actuation chamber is formed between an outer circumference of the rotor and an inner surface of the housing in a circumferential direction.

A first end of the first oil line communicates with the oil storage chamber, wherein a second end of the first oil line communicates with a first end of the second oil line, and wherein a second end of the second oil line communicates with the actuation chamber.

The valve is installed at one position in an outer surface of the rotor.

The valve and a part of the first oil line which communicates with the oil storage chamber respectively are arranged to be directed in the same direction based on the shaft.

The valve and a part of the first oil line which communicates with the oil storage chamber respectively are arranged to be directed in opposite directions based on the shaft.

An oil seal is installed in a junction between an outer circumferential surface of the shaft and an inner circumferential surface of the housing.

The shaft is configured to be rotated by a drive force of an engine.

As described above, the present invention is advantageous in that an oil circulation line is formed in both the shaft and the rotor, and the oil storage chamber formed in the rotor is sealed, so the amount of oil leaking from the oil storage chamber into the actuation chamber can be minimized when the vehicle is turned off, thereby improving the initial starting performance, reducing the crank load, and improving the initial acceleration performance during the next cold start operation of the vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
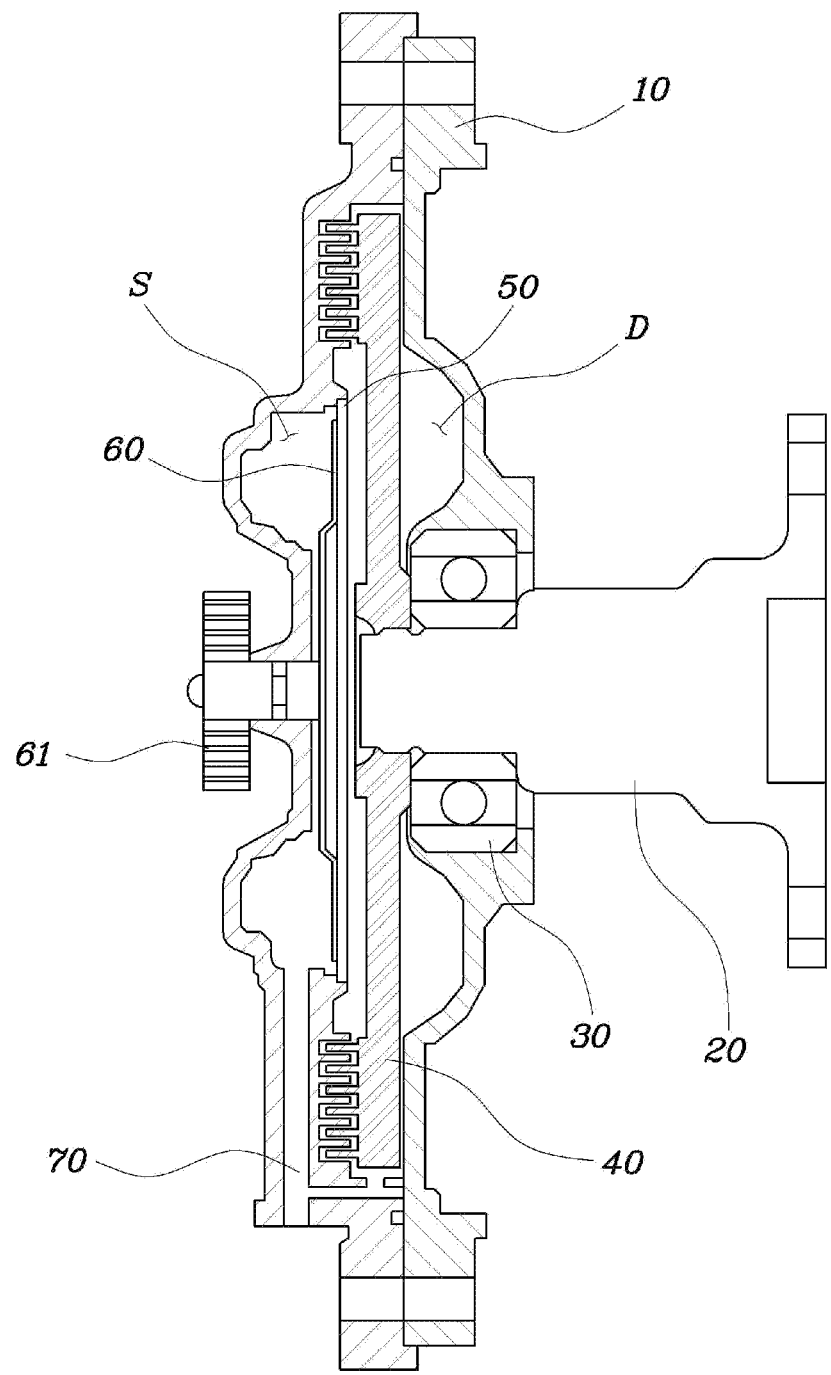
FIG. 1 is a sectional view illustrating the construction of a conventional fan clutch for a vehicle.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinbelow, preferred embodiments of the present invention will be described in detail with reference to the accompanying drawings.

Figure 2:
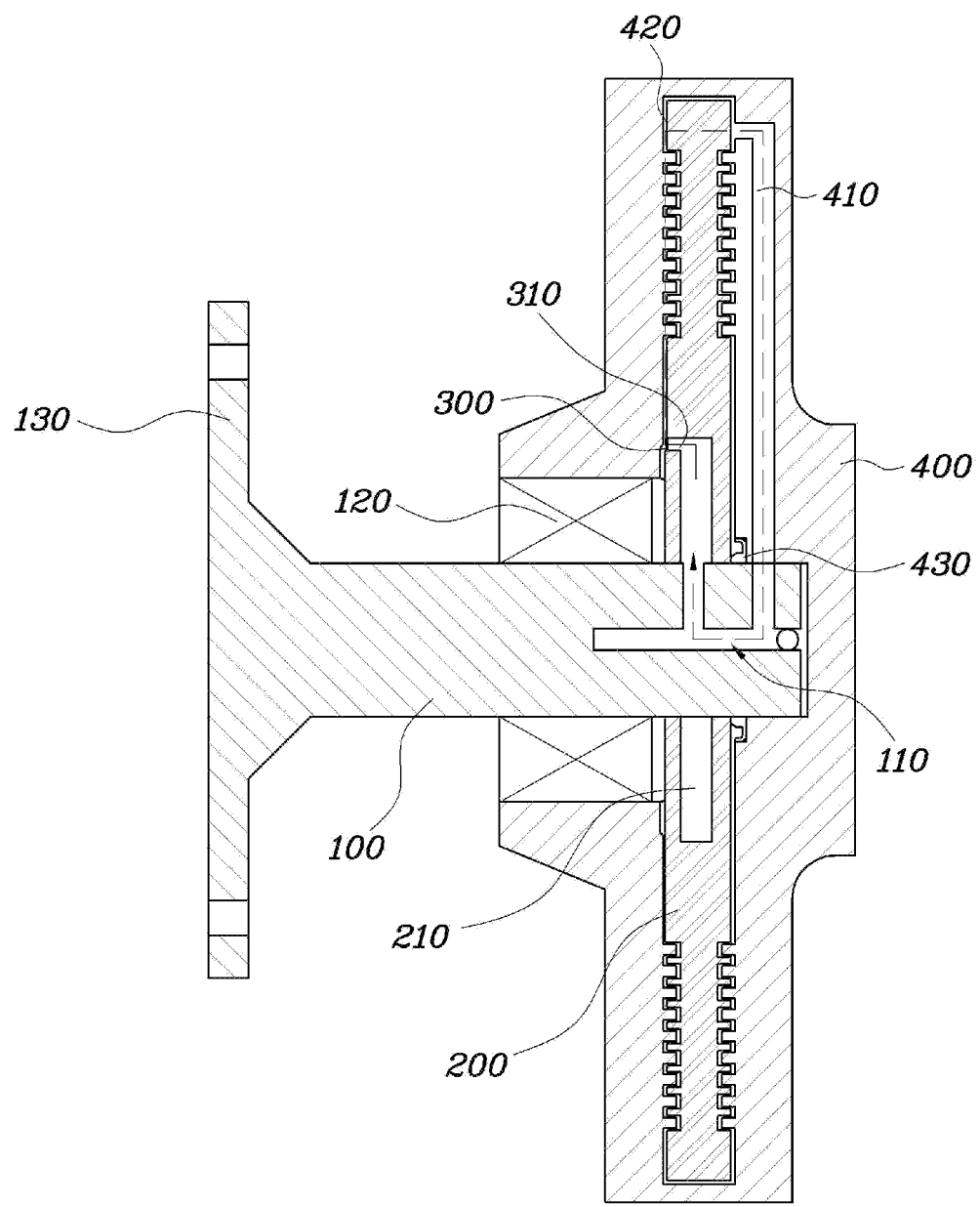
FIG. 2 is a sectional view illustrating the construction of a fan clutch for a vehicle according to an exemplary embodiment of the present invention.
Figure 3:
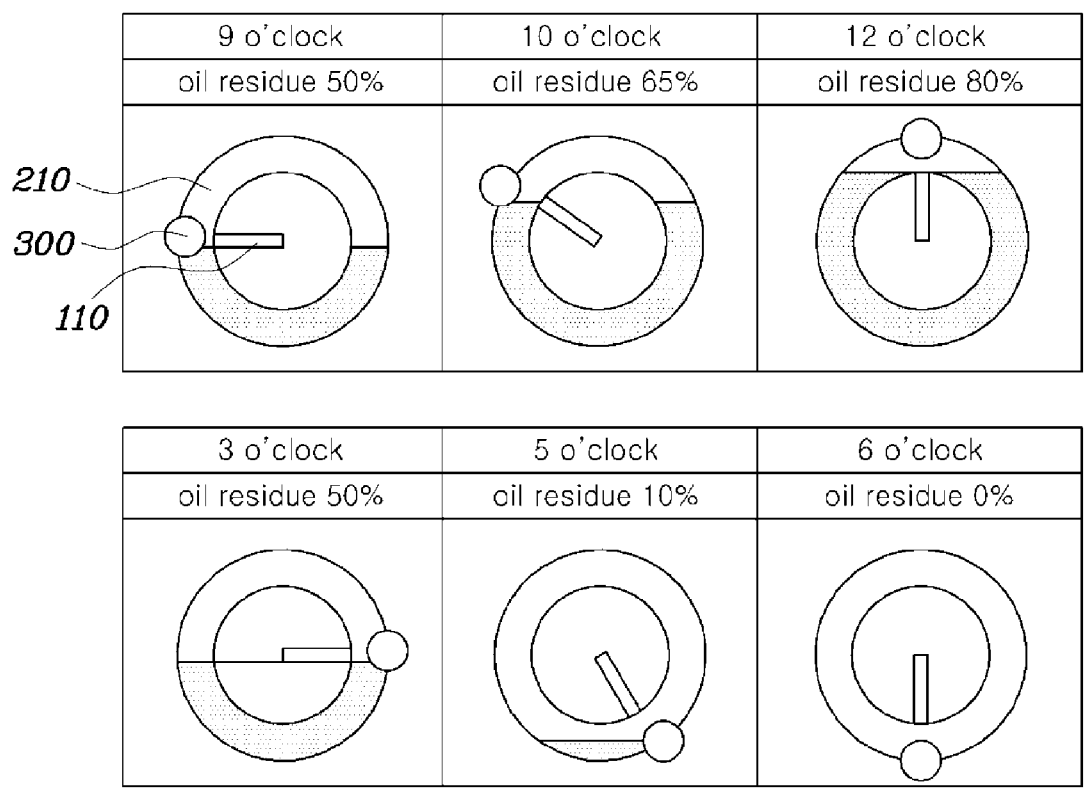
FIG. 3 is a view illustrating the variable amount of oil residue that remains in an actuation chamber of the fan clutch of the present invention according to the position of a valve.

FIG. 2 is a sectional view illustrating the construction of a fan clutch for a vehicle according to an exemplary embodiment of the present invention. FIG. 3 is a view illustrating the variable amount of oil residue that remains in the actuation chamber 420 of the fan clutch of the present invention according to the position of a valve 300.

The fan clutch for the vehicle according to an exemplary embodiment of the present invention includes a shaft 100, a rotor 200, the valve 300 and a housing 400.

As shown in FIG. 2, the fan clutch for the vehicle according to an exemplary embodiment of the present invention includes: a shaft 100 that is rotated by the drive force of an engine, and is provided with a first oil line 110 formed in the shaft 100 in a radial direction, a rotor 200 that is rotated in combination with the shaft 100, and is provided with an oil storage chamber 210 formed in the rotor 200 such that the oil storage chamber 210 communicates with the first oil line 110, a valve 300 that is formed in the end of the oil storage chamber 210 such that the valve 300 can be opened, and is configured to allow oil stored in the oil storage chamber 210 to flow to the outside of the rotor 200, and a housing 400 that is formed to surround the rotor 200, and is provided with a second oil line 410 through which the oil that has flowed through the valve 300 can flow to the first oil line 110 through the actuation chamber 420.

In other words, the first oil line 110 is formed in the shaft 100 so as to allow oil circulation, and the oil storage chamber 210 is formed in the rotor 200 so as to seal the oil storage chamber 210, thereby minimizing the amount of oil that flows from the oil storage chamber 210 into the actuation chamber 420.

In an exemplary embodiment of the present invention, the oil storage chamber 210 may be formed inside the inner circumference of the rotor 200 in a circumferential direction such that the oil storage chamber 210 surrounds the shaft 100, and the actuation chamber 420 may be formed between the outer circumference of the rotor 200 and the housing 400 in a circumferential direction.

Here, the first end of the first oil line 110 may be configured to communicate with the oil storage chamber 210, the second end of the first oil line 110 may be configured to communicate with the first end of the second oil line 410, and the second end of the second oil line 410 may be configured to communicate with the actuation chamber 420.

In other words, the oil stored in the oil storage chamber 210 flows into the actuation chamber 420 through the valve 300, the oil that has flowed into the actuation chamber 420 flows to the second oil line 410 of the housing 400, the oil that has flowed into the second oil line 410 flows into the first oil line 110 of the shaft 100, and the oil that has flowed into the first oil line 110 flows to the oil storage chamber 210 of the rotor 200 and is stored in the oil storage chamber 210. Therefore, the oil can circulate in a sealed system.

Further, the valve 300 may be provided at a predetermined location in the outer surface of the rotor 200. That is, the valve 300 is provided in the outer surface of the rotor 200 which communicates with the oil storage chamber 210.

Here, to install the valve 300, a valve hole 310 may be formed in the oil storage chamber 210 and the valve 300 may be installed in the valve hole 310.

Further, the valve 300 of the present invention may use a solenoid valve that is opened or closed in response to an application of an electric current or a bimetal valve that is opened or closed in response to the temperature of cooling water.

Further, in an exemplary embodiment of the present invention, the valve 300 and the part of the first oil line 110 which communicates with the oil storage chamber 210 respectively may be arranged to be directed in the same direction based on the shaft 100.

Due to the above-mentioned construction, when ignition of the vehicle is turned off, the on/off signal for opening or closing the valve 300 is not applied, so the valve 300 is opened. Here, the amount of oil residue stored in the oil storage chamber 210 is determined by positions of both the valve 300 and the first oil line 110.

Described in detail, FIG. 3 is a view illustrating the oil residue that varies according to the position of the valve 300 in the structure in which both the valve 300 and the first oil line 110 are arranged in the same direction. In the above case, the oil storage chamber 210 is formed in the rotor 200, and the valve 300 is installed at only one position in the rotor 200, so the variable amount of oil residue that remains in the oil storage chamber 210 according to the position of the valve 300 may be 50% or more. This means that the amount of oil residue remaining in the oil storage chamber 210 is more than that of the conventional fan clutch.

Accordingly, the present invention can minimize the amount of oil leaking from the oil storage chamber 210 into the actuation chamber 420, so the present invention can minimize the shearing force generated in the fan clutch during a cold start operation, thereby improving the initial starting performance, reducing the crank load, and improving the acceleration performance of the vehicle.

Further, in an exemplary embodiment of the present invention, the valve 300 and the part of the first oil line 110 which communicates with the oil storage chamber 210 respectively may be arranged to be directed in opposite directions based on the shaft 100. In other words, the valve 300 and the first oil line 110 may be formed such that they are directed in opposite directions. For example, when the valve 300 is installed to be directed to the 12 o'clock direction, the first oil line 110 may be formed to be directed to the 6 o'clock direction.

Further, in an exemplary embodiment of the present invention, an oil seal 430 may be installed in the junction between the outer circumferential surface of the shaft 100 and the inner circumferential surface of the housing 400. In this case, the present invention can prevent the oil that flows from the second oil line 410 to the first oil line 110 from flowing into the actuation chamber 420.

Further, the shaft 100 may be configured such that it can be rotated by the drive force of the engine which has been transferred thereto. In other words, a pulley 130 may be formed in the end of the shaft 100 such that the pulley 130 can be coupled to a drive pulley of the engine, so the drive force of the engine can be transmitted to the shaft 100, thereby rotating the shaft 100.

Hereinbelow, the operation of the fan clutch for the vehicle according to an exemplary embodiment of the present invention will be described.

First, when the valve 300 is being maintained in a closed state in response to a valve closing signal that has been applied thereto while the vehicle is driven, the oil is maintained in a stored state in the oil storage chamber 210, so only both the shaft 100 and the rotor 200 are rotated, and the housing 400 is not rotated. Here, the reference numeral 120 shown in FIG. 2 denotes a bearing. Due to the bearing 120, only both the shaft 100 and the rotor 200 are rotated in the above state.

Thereafter, when the valve 300 is opened in response to a valve opening signal applied thereto, the oil flows from the oil storage chamber 210 into the actuation chamber 420 through the valve 300, so the rotating force of the rotor 200 is transmitted to the housing 400 by the viscosity resistance of the oil, and the housing 400 is rotated along with the rotor 200. Here, the slipping between the rotor 200 and the housing 400 is reduced in proportion to an increase in the amount of oil that has been introduced into the actuation chamber 420, so the rotating speed of the cooling fan is further increased.

However, when the engine of the vehicle is stopped and the ignition is turned off, the signal is not further applied to the valve 300, so the valve 300 is changed to an open state. In the above state, the present invention can improve the cold start performance and can prevent a reduction in the acceleration performance of the vehicle. In other words, in an exemplary embodiment of the present invention, the oil storage chamber 210 is formed in the rotor 200 and the valve 300 is installed at only one position in the outer surface of the rotor 200, so the present invention can minimize the amount of oil leaking from the oil storage chamber 210 into the actuation chamber 420, thereby improving the cold start performance and preventing a reduction in the acceleration performance of the vehicle.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A fan clutch for a vehicle, comprising:
   a shaft rotated by a drive force and having a first oil line formed in the shaft in a radial direction thereof;
   a rotor rotated in combination with the shaft, wherein the rotor includes an oil storage chamber formed in the rotor and the oil storage chamber communicates with the first oil line;
   a valve formed in a first end of the oil storage chamber and being selectively opened, wherein the valve is configured to allow oil stored in the oil storage chamber to flow to an outside of the rotor through the valve when the valve is opened, and the oil in the outside of the rotor is allowed to flow into the oil storage chamber through a first end of the first oil line when the valve is closed; and
   a housing formed to surround the rotor, and provided with a second oil line to communicate with the first end of the first oil line such that the oil that has flowed through the valve flows to the first oil line through an actuation chamber surrounding the rotor and formed in the housing,
   wherein the housing is rotatable by a viscosity resistance of the oil stored in the actuation chamber between the rotor and the housing while the oil stored in the oil storage chamber flows into the actuation chamber through the valve when the valve is opened.

2. The fan clutch for the vehicle as set forth in claim 1, wherein the oil storage chamber is formed inside an inner circumference of the rotor in a circumferential direction such that the oil storage chamber surrounds the shaft; and the actuation chamber is formed between an outer circumference of the rotor and an inner surface of the housing in a circumferential direction.

3. The fan clutch for the vehicle as set forth in claim 1, wherein a second end of the first oil line communicates with a second end of the oil storage chamber;

wherein the first end of the first oil line communicates with a first end of the second oil line; and wherein a second end of the second oil line communicates with the actuation chamber.

4. The fan clutch for the vehicle as set forth in claim 1, wherein the valve is installed at one position in an outer surface of the rotor.

5. The fan clutch for the vehicle as set forth in claim 1, wherein the valve and a part of the first oil line which communicates with the oil storage chamber respectively are arranged to be directed in the same direction based on the shaft.

6. The fan clutch for the vehicle as set forth in claim 1, wherein the valve and a part of the first oil line which communicates with the oil storage chamber respectively are arranged to be directed in opposite directions based on the shaft.

7. The fan clutch for the vehicle as set forth in claim 1, wherein an oil seal is installed in a junction between an outer circumferential surface of the shaft and an inner circumferential surface of the housing.

8. The fan clutch for the vehicle as set forth in claim 1, wherein the shaft is configured to be rotated by a drive force of an engine.

* * * * *